(No Model.)
A. F. WOODHAM.
ICE VELOCIPEDE.
No. 266,945. Patented Oct. 31, 1882.
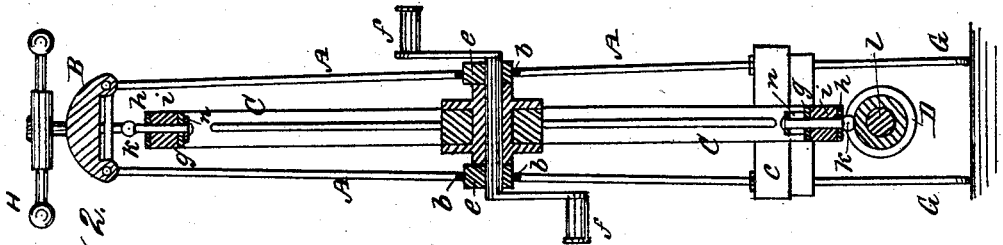
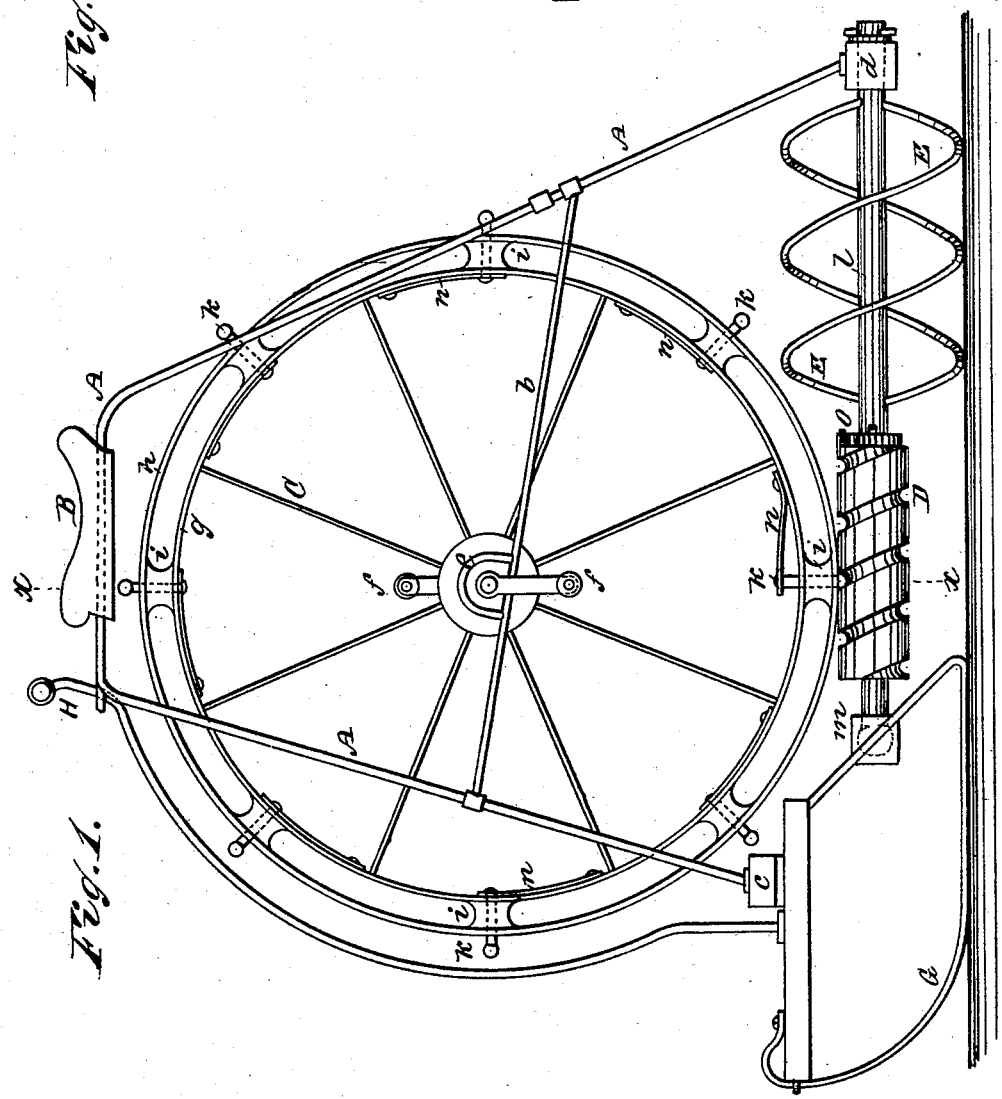
WITNESSES:
Theo. G. Hoster
C. Sedgwick
INVENTOR:
A. F. Woodham
BY Munn &Co.
ATTORNEYS.

UNITED STATES PATENT OFFICE.

AUGUSTUS F. WOODHAM, OF MINNEAPOLIS, MINNESOTA.

ICE-VELOCIPEDE.

SPECIFICATION forming part of Letters Patent No. 266,945, dated October 31, 1882.

Application filed April 8, 1882. (No model.)

*To all whom it may concern:*

Be it known that I, AUGUSTUS F. WOODHAM, of Minneapolis, in the county of Hennepin and State of Minnesota, have invented certain new and useful Improvements in Ice-Velocipedes, of which the following is a full, clear, and exact description.

Reference is to be had to the accompanying drawings, forming part of this specification, in which similar letters of reference indicate corresponding parts in both the figures.

Figure 1 represents a side elevation of an ice-velocipede constructed in accordance with my invention, and Fig. 2 is a vertical section of the same on the line $xx$ in Fig. 1.

This invention relates to a velocipede for traveling on ice and other smooth surfaces; and it consists in a velocipede or vehicle in which are combined a suspended driving-wheel for operation by the feet of the rider, front sled-runners having an attached hand steering device, and a rear spiral propeller actuated by attachments on the driving-wheel arranged to engage with a screw on the shaft of the propeller, which latter and the runners form the bearing-supports for the vehicle on the surface it is designed to travel over.

The invention also consists in various novel constructions and combinations of details in such a vehicle, whereby its efficiency is promoted.

In the drawings, A is the frame of the vehicle, which is a continuous bent one, braced by suitable stays, $b$, and secured at its lower ends to a bolster, $c$, and bench or frame-piece $d$.

Arranged on top of the frame A is a saddle-seat, B, for the rider. This seat is adjustable on or along said frame to adapt it to the convenience of the rider.

Mounted on the braces $b$ of the frame are journal-boxes $e$ for carrying a suspended driving-wheel, C, which is rotated by the driver on his seat by means of foot cranks or pedals $f$. This wheel has two concentric rims or bands, $g\ h$, which are connected by a series of boxes, $i$, that form bearings for a series of radial rotating driving-pins, $k$, which project beyond the outer periphery of the wheel, and are rounded or knob-shaped where they so project. These pins engage successively, as the wheel C is rotated by the driver, with a lower spirally-grooved cylinder or screw, D, mounted on a shaft, $l$, which has its rear bearing in the frame-piece $d$ and its front bearing in a ball-and-socket-jointed box, $m$. The pins $k$ are attached to the inside rim, $g$, of the wheel C by springs $n$ to give them an easy action when engaging with and disengaging from the screw D, which latter it is preferred also to construct so that it will present a self-oiling exterior surface. By means of the spring-borne rotating pins $k$, carried by the driving-wheel C, rotary motion is imparted to the screw D, which may be connected with its shaft $l$ by a ratchet and pawl, $o$, to prevent back action. This rotary motion is communicated to a rear spiral propeller, E, on the shaft $l$, by which the vehicle is propelled, and supported in its rear on the surface it travels over. Said vehicle is supported in front by sled-runners G, which should be made capable of slightly swiveling or turning in order to steer the vehicle by means of a hand steering device, H, and which runners or their frame may be connected with the ball-and-socket-jointed box $m$ by a clasp or otherwise.

The construction of the frame, especially as regards the frame-piece $d$ and portion A, connecting therewith, may be variously modified; also, the ratchet-and-pawl device $o$ may be applied to both ends of the screw D, and instead of the pins $k$ wholly turning only the knobs on the outer ends of the same may be fitted to rotate.

Having thus fully described my invention, I claim as new and desire to secure by Letters Patent—

1. In a velocipede, the combination of a suspended driving-wheel having attachments for engaging a screw, front sled-runners having an attached hand steering device, and a rear spiral propeller having a screw on its shaft, as and for the purpose specified.

2. The driving-wheel C, constructed of inner and outer rims or bands, $g\ h$, having boxes $i$ in between them, in combination with the radial pins $k$, fitted to work in said boxes, and the springs $n$, pressing said pins outward, essentially as described.

3. The shaft $l$, supported by a ball-and-socket joint, and the screw D and propeller E, in combination with the runners and runner-frame of the vehicle, substantially as specified.

AUGUSTUS F. WOODHAM.

Witnesses:
 MILLARD F. BOWEN,
 JAMES K. WILSON.